United States Patent
Zhou et al.

(10) Patent No.: US 9,485,106 B2
(45) Date of Patent: Nov. 1, 2016

(54) METHOD FOR PROCESSING TDF SESSION AND PCRF

(71) Applicant: ZTE CORPORATION, Shenzhen, Guangdong Province (CN)

(72) Inventors: Xiaoyun Zhou, Shenzhen (CN); Jinhua Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 77 days.

(21) Appl. No.: 14/385,699

(22) PCT Filed: Apr. 15, 2013

(86) PCT No.: PCT/CN2013/074221
§ 371 (c)(1),
(2) Date: Sep. 16, 2014

(87) PCT Pub. No.: WO2013/135213
PCT Pub. Date: Sep. 19, 2013

(65) Prior Publication Data
US 2015/0071126 A1    Mar. 12, 2015

(30) Foreign Application Priority Data

Mar. 16, 2012  (CN) .......................... 2012 1 0070867
May 24, 2012   (CN) .......................... 2012 1 0178002

(51) Int. Cl.
| | | |
|---|---|---|
| *H04L 12/14* | (2006.01) | |
| *H04W 76/06* | (2009.01) | |
| *H04M 15/00* | (2006.01) | |
| *H04L 12/26* | (2006.01) | |
| *H04L 29/06* | (2006.01) | |
| *H04L 12/24* | (2006.01) | |

(52) U.S. Cl.
CPC ....... *H04L 12/1407* (2013.01); *H04L 41/0893* (2013.01); *H04L 43/028* (2013.01); *H04L 65/1003* (2013.01); *H04M 15/66* (2013.01); *H04W 76/062* (2013.01)

(58) Field of Classification Search
None
See application file for complete search history.

(56) References Cited

U.S. PATENT DOCUMENTS

2012/0246325 A1* 9/2012 Pancorbo Marcos ............... H04L 12/2602
709/227

FOREIGN PATENT DOCUMENTS

ES    WO 2012063106 A1 *  5/2012  ............. H04L 47/20

OTHER PUBLICATIONS

ZTE. C3-121042: TDF session linking for unsolicited application reporting. 3GPP TSG-CT WG3 Meeting #69.May 21, 2012 see p. 2, lines 16-20 and p. 3, lines 3-6.
ZTE et al. C3-121211: TDF session linking for unsolicited application reporting. 3GPP TSG-CT WG3 Meeting #69.May 25, 2012 see p. 2,lines 16-20 and p. 3, lines 2-9.

(Continued)

*Primary Examiner* — Kouroush Mohebbi
(74) *Attorney, Agent, or Firm* — Pearl Cohen Zedek Latzer Baratz LLP (57) ABSTRACT

A method for processing Traffic Detection Function (TDF) session and a Policy and Charging Rules Function (PCRF) are provided. The method includes: the PCRF links a first TDF session related with a proxy mobile Internet Protocol version 4 (IPv4) address and a second TDF session related with a first proxy mobile Internet Protocol version 6 (IPv6) address to a same IP Connectivity Access Network (IP-CAN) session; when the IPv4 address of the IP-CAN session is released, the PCRF requests the TDF to terminate the first TDF session.

15 Claims, 5 Drawing Sheets

(56) References Cited

OTHER PUBLICATIONS

3GPP Technical Specification Group Core Network and Terminals. 3GPP TS 29.212 V10.5.0: Policy and Charging Control (PCC) over Gx reference point (Release 10). 3rd Generation Partnership Project (3GPP). Dec. 31, 2011 see p. 12, lines 7-11 and p. 63, lines 44-49.

International Search Report for International Application No. PCT/CN2013/074221, mailed Jul. 18, 2013.

* cited by examiner

METHOD FOR PROCESSING TDF SESSION AND PCRF

CROSS-REFERENCE TO RELATED APPLICATIONS

This application is a National Phase Application of PCT International Application No. PCT/CN2013/074221, International Filing Date Apr. 15, 2013, claiming priority of Chinese Patent Applications Nos. 201210070867.5, filed Mar. 16, 2012, and 201210178002.0, filed May 24, 2012, which is/are hereby incorporated by reference.

FIELD OF THE INVENTION

The present invention relates to the field of communications, and in particular to a method for processing Traffic Detection Function (TDF) session and a Policy and Charging Rules Function (PCRF).

BACKGROUND OF THE INVENTION

Since the establishment of the 3$^{rd}$ Generation Partnership Project Release7 (3GPP Release7) standard system, the policy and charging function is realized by a Policy and Charging Control (PCC) framework. The PCC framework is a functional framework applicable to multiple access technologies, for example, the PCC framework is applicable to a Universal Mobile Telecommunications System (UMTS) Terrestrial Radio Access Network (UTRAN), Global System for Mobile Communication (GSM)/Enhanced Data Rate for GSM Evolution (EDGE) radio access network, an Interworking Wireless Local Area Network (I-WLAN) and an Evolved Packet System (EPS), etc.

Figure 1:
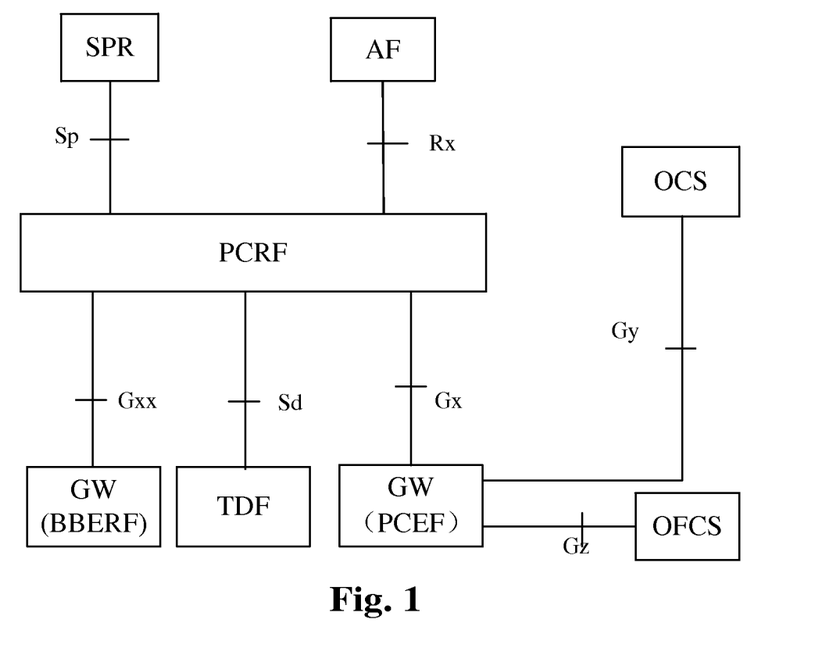
FIG. 1 is a schematic diagram of a PCC framework in Rel-11 according to the relevant technology.

The PCC mainly realizes two functions, that is, a policy control function and a charging function. FIG. 1 is a schematic diagram of a PCC framework in existing Rel-11. Hereinafter, each logical function and the interface function thereof in the PCC framework shown in FIG. 1 are described. As shown in FIG. 1:

An Application Function (AF) is configured to provide an access point of traffic application, wherein network resources used by the traffic application need to be processed with dynamical policy control. When parameter negotiation is conducted on a traffic plane, the AF transmits related traffic information to the PCRF. If the traffic information is consistent with the policy of the PCRF, the PCRF accepts the negotiation; otherwise, the PCRF rejects the negotiation, and provides traffic parameters acceptable by the PCRF during feedback. Subsequently, the AF may return these parameters to User Equipment (UE), wherein the interface between the AF and the PCRF is an Rx interface.

The PCRF is the core of the PCC and is responsible for establishing policy and charging rules. The PCRF provides network control rules based on a traffic data flow, wherein the network control includes detection, gating control, Quality of Service (QoS) control of the traffic data flow, and charging based on the data flow. The PCRF sends the policy and charging rules established by the PCRF itself to a Policy and Charging Enforcement Function (PCEF) to execute. Meanwhile, the PCRF also needs to guarantee the consistency between the rules and the subscription information of a user. The basis for the PCRF to establish the policy and charging rules includes: obtaining traffic related information from the AF, obtaining user subscription information of policy and charging control associated with policy control and charging from a Subscription Profile Repository (SPR), and obtaining bearer related network information from the PCEF.

The PCEF is generally located inside a Gate-Way (GW) and is used for executing the policy and charging rules established by the PCRF on a bearer plane. The PCEF detects traffic data flows according to a traffic data flow filter in the rules sent by the PCRF, thereby executing the policy and charging rules established by the PCRF for the traffic data flow. When a bearer is established, the PCEF allocates resources according to the rules sent by the PCRF and performs gating control according to the information provided by the AF. Meanwhile, the PCEF triggers the report of events occurring on a bearer network according to an event subscribed by the PCRF. According to the charging rules sent by the PCRF, the PCEF executes a corresponding traffic data flow charging operation, wherein the charging can be online charging or offline charging. If in the online charging, the PCEF needs to perform credit management together with an Online Charging System (OCS); if in the offline charging, the PCEF exchanges related charging information with an Offline Charging System (OFCS). The interface between the PCEF and the PCRF is a Gx interface; the interface between the PCEF and the OCS is a Gy interface; and the interface between the PCEF and the OFCS is a Gz interface. The PCEF can also have the TDF. The PCEF can perform application detection and policy execution (for example, gating control, redirection and bandwidth limit) according to local configurations or PCC rules containing an application detection and control policy distributed by the PCRF. The PCEF is generally located on a network gateway, such as a Packet Data Network Gateway (PDN-GW) of EPS, a General Packet Radio Service (GPRS) Gateway Support Node (GGSN), and a Packet Data Gateway (PDG) in an Interworking Wireless Local Area Network (I-WLAN).

Of course, the TDF can also be deployed separately; at this time, the TDF is connected with the PCRF through an Sd interface; the TDF can perform application detection and policy execution according to an Application Detection and Control (ADC) rule preconfigured or distributed by the PCRF.

A Bearer Binding and Event Reporting Function (BBERF) is generally located in an access network gateway. For example, when the user equipment accesses the EPS through an E-UTRAN and Proxy Mobile Internet Protocol version6 (PMIPv6) is applied between an S-GW and a P-GW, the BBERF exists in the S-GW. When the user equipment accesses the EPS through a trusted non-3GPP access network, the BBERF also exists in the trusted non-3GPP access gateway.

The SPR stores the user subscription information of policy and charging control associated with policy control and charging. The interface between the SPR and the PCRF is an Sp interface. The OCS and the PCEF together accomplish the user credit control and management in the online charging mode. The OFCS and the PCEF together accomplish the charging operation in the offline charging mode.

Figure 2:
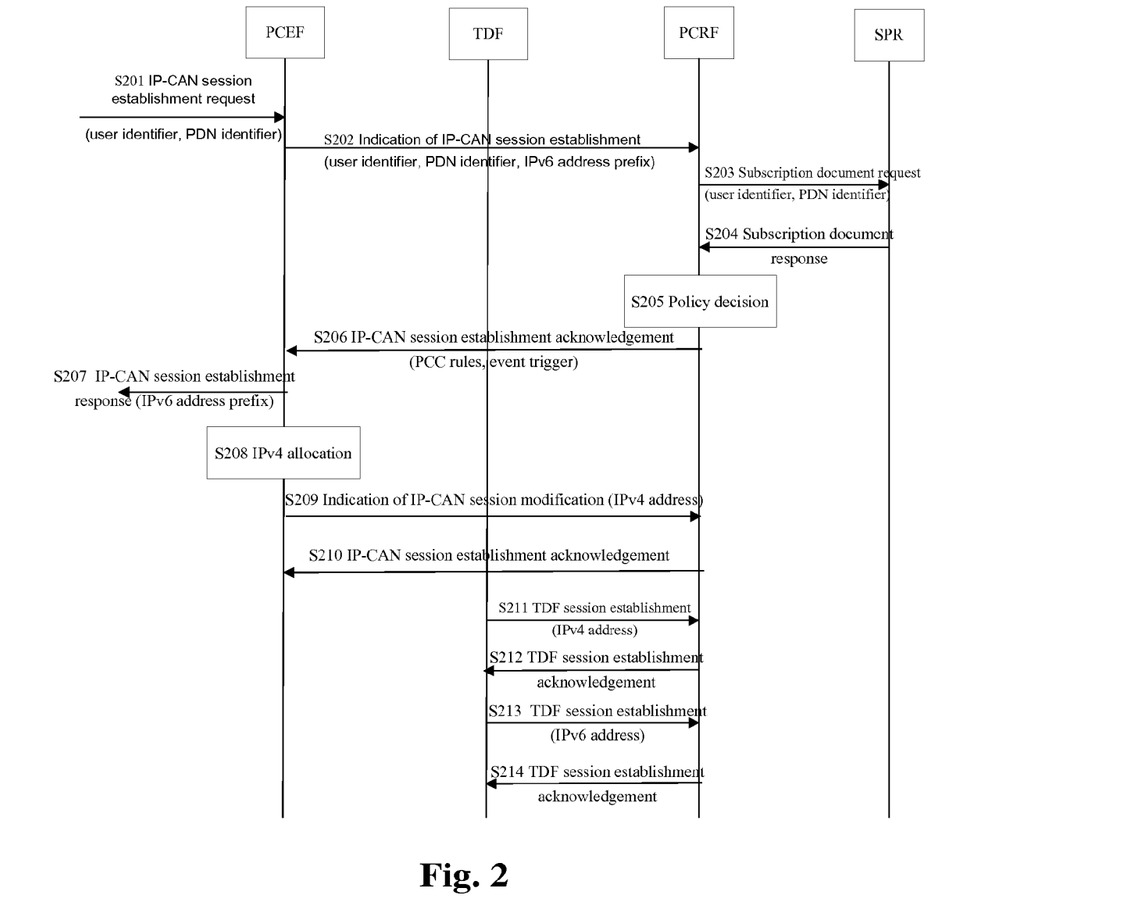
FIG. 2 is a flowchart of establishing a TDF session between a TDF and a PCRF in an IP-CAN session according to the relevant technology.

FIG. 2 is a flowchart of establishing a TDF session between a TDF and a PCRF in an existing IP-CAN session process, wherein the TDF applies a non-requested report mode. As shown in FIG. 2, the process includes Step S201 to Step S214:

Step S201: During the process of UE requesting establishment of an IP-CAN session, a gateway where a PCEF is located receives an IP-CAN session establishment request message, wherein a user identifier and a PDN identifier of the PDN network which the user requests to access are carried in the IP-CAN session establishment request message.

Step S202: The PCEF sends an IP-CAN session establishment indication message to the PCRF, wherein the user identifier, the PDN identifier and an IPv6 address prefix allocated for the UE are carried in the IP-CAN session establishment indication message.

Step S203: After judging that there is no subscription information of the user according to the user identifier, the PCRF sends a subscription document request to an SPR and makes the subscription document request carry the user identifier and the PDN identifier.

Step S204: The SPR returns corresponding user subscription information (through a subscription document response) according to the user identifier and the PDN identifier.

Step S205: The PCRF makes a policy decision (including establishing PCC rules and event triggers) according to returned user subscription information, network policy, UE access information and the like.

Step S206: The PCRF sends an IP-CAN session establishment acknowledgement message to the PCEF, wherein the PCC rules and event triggers are carried in the IP-CAN session establishment acknowledgement message.

Step S207: The PCEF installs the policy; the gateway where the PCEF is located returns an IP-CAN session establishment response to the UE, wherein the IPv6 address prefix is carried in the IP-CAN session establishment response.

Step S208: If the network supports a dual stack, the gateway where the PCEF is located or another external network element further allocates an IPv4 address according to a request from the UE.

Step S209: The PCEF sends an IP-CAN session modification indication to the PCRF, wherein the IPv4 address is carried in the IP-CAN session modification indication to inform the PCRF that the IP-CAN session has a new IPv4 address.

Step S210: The PCRF returns the acknowledgement message of the IP-CAN session modification indication to the PCEF.

Through the processes shown in FIG. 2, the UE can construct an IPv6 address according to the IPv6 address prefix and access a traffic using the IPv6 address and the IPv4 address.

Step S211: The TDF detects the data flow flowing therethrough according to a preconfigured ADC rule. When detecting that one application of the IPv4 address (which is allocated in Step S208) needs to be reported, the TDF sends a TDF session establishment message to the PCRF (since the TDF session corresponding to the IPv4 is not established), wherein the IPv4 address and the detected application identifier are carried in the TDF session establishment message. If flow description information of the detected application can be derived, the TDF makes the establishment message carry the flow description information. The PCRF links the TDF session with the IP-CAN session according to the IPv4 address obtained from the PCEF and the IPv4 address obtained from the TDF. The PCRF updates the policy associated with the IP-CAN session according to the application information reported by the TDF.

Step S212: The PCRF returns the acknowledgement message of the TDF session establishment message.

Step S213: Before receiving the message from Step S212, if the TDF detects that one application of the IPv6 address (which is constructed by the UE according to the IPv6 address prefix in Step S207) needs to be reported, the TDF sends a TDF session establishment message to the PCRF (since the TDF session corresponding to the IPv6 is not established), wherein the IPv6 address and the detected application identifier are carried in the TDF session establishment message. If flow description information of the detected application can be derived, the TDF makes the establishment message carry the flow description information. The PCRF links the TDF session with the IP-CAN session according to the IPv6 address obtained from the PCEF and the IPv6 address obtained from the TDF. The PCRF updates the policy associated with the IP-CAN session according to the application information reported by the TDF.

Step S214: The PCRF returns the acknowledgement message of the TDF session establishment message.

The scenarios executed in above steps are different, thus the TDF locations are different. For the home routing roaming scenario, the TDF is located at home to establish a TDF session with the H-PCRF; for local breakout roaming scenario, the TDF is located at visited to establish a TDF with the V-PCRF.

Through the above processes, the two TDF sessions are linked to one IP-CAN at the same time, and the TDF reports the application related with the IPv4 address and the application related with the IPv6 address to the PCRF through the two TDF sessions, respectively. Then, since the IPv4 address can be applied for and released dynamically, if the UE releases the IPv4 address, the network allocates the same IPv4 address to other UE. According to the relevant technology, the TDF can report the application information through the TDF session established for the UE in the above processes, thereby resulting in the PCRF making a wrong policy.

Furthermore, if the network also supports the IPv6 prefix delegation (i.e., the network supports the allocation of a short prefix), when the UE constructs two or more IPv6 addresses according to the IPv6 prefix and accesses the traffic, since the TDF is unable to determine whether these IPv6 addresses belong to the same IP-CAN session (if the TDF is unable to obtain the IPv6 prefix allocated by the network for the UE, the TDF assumes that the IPv6 addresses, of which any previous 64 bits are different, are from different UE), an IP-CAN session is also present, while the TDF session associated with an IPv4 address and the TDF session associated with one or more IPv6 addresses are present. If the UE releases the IPv4 address, the network allocates the same IPv4 address to other UE. According to the relevant technology, the TD can report the application information through the TDF session established for the UE in the above processes, thereby resulting in the PCRF formulating a wrong policy.

In fact, for the IP-CAN session supporting the dual stack, the TDF session related with one IPv4 address exists in the IP-CAN session. If the UE releases the IPv4 address, the network allocates the same IPv4 address to other UE. According to the relevant technology, the TDF can report the application information through the TDF session established for the UE in the above processes, thereby resulting in the PCRF making a wrong policy.

SUMMARY OF THE INVENTION

The present invention provides a method for processing TDF session and a PCRF, to at least solve the problem in the relevant technology that the PCRF makes a wrong policy because the IPv4 address is released only and the TDF session related with the IPv4 address is not terminated when the IPv4 address of the IP-CAN session is released.

According to an aspect of the invention, there is provided a method for processing TDF session, the method includes the steps of:

a PCRF links a first TDF session related with an IPv4 address and a second TDF session related with a first IPv6 address to a same IP-CAN session; and when the IPv4 address of the IP-CAN session is released, the PCRF requests the TDF to terminate the first TDF session.

Preferably, the release of IPv4 address of the IP-CAN session includes the step that: a PCEF sends an Indication of IP-CAN session modification message to the PCRF, wherein an IP address release indication and the released IPv4 address are carried in the Indication of IP-CAN session modification message.

Preferably, requesting the TDF to terminate the first TDF session includes the step that: the PCRF sends a first message that requests termination of the first TDF session to the TDF, wherein a cause value indicating why the TDF session is terminated is carried in the first message, wherein the cause value is IPv4 address release.

Preferably, the first message is a Re-Authentication Request (RAR) message, wherein a value of Session-Id AVP carried in the RAR message is a session identifier of the first TDF session, and the value of Session-Release-Clause AVP carried in the RAR message is IP_ADDRESS_RELEASE.

Preferably, after the PCRF sends the first message that requests termination of the first TDF session to the TDF, the method further includes the steps that: the TDF returns an acknowledgement message of the first message to the PCRF; and the TDF sends a second message that requests termination of the first TDF session to the PCRF.

Preferably, the second message is a Credit Control Request (CCR) message, wherein the value of Session-Id AVP carried in the CCR message is the session identifier of the first TDF session, and the value of CC-Release-Type AVP carried in the CCR message is TERMINATION_REQUEST.

Preferably, after the PCRF receives the second message that requests termination of the TDF session related with the IPv4 address sent by the TDF, the method further includes the step that: the PCRF returns the acknowledgement message of the second message to the TDF.

Preferably, after the PCRF returns the acknowledgement message of the second message to the TDF, the method further includes the steps that: in the case that the IPv4 address is allocated to the IP-CAN session of other UE, when the TDF detects that an application corresponding to the IPv4 address needs to be reported, if the TDF determines that the IPv4 address and the second IPv6 address belong to the same IP-CAN session, and the TDF session corresponding to the second IPv6 address has been established, the TDF reports application information of the IPv4 address through the TDF session corresponding to the second IPv6 address; and in the case that the IPv4 address is allocated to the IP-CAN session of other UE, when the TDF detects that the application corresponding to the IPv4 address needs to be reported, if the TDF is unable to determine whether the IPv4 address and the second IPv6 address belong to the same IP-CAN session, the TDF initiates a TDF session establishment process of the IPv4 address to the PCRF.

The present invention further provides a method for processing TDF session and a PCRF, to at least solve the problem in the relevant technology that the PCRF formulates a wrong policy because the IPv4 address is released only and the TDF session associated with the IPv4 address is not terminated when the IPv4 address of the IP-CAN session is released.

According to another aspect of the present invention, there is provided a method for processing TDF session, the method includes the steps that: a PCRF links a first TDF session related with an IPv4 address to one IP-CAN session; and when the IPv4 address of the IP-CAN session is released, the PCRF requests the TDF to terminate the first TDF session.

Preferably, the IPv4 address release of the IP-CAN session includes the step that: a PCEF sends an Indication of IP-CAN session modification message to the PCRF, wherein an IP address release indication and the released IPv4 address are carried in the Indication IP-CAN session modification message.

Preferably, requesting the TDF to terminate the first TDF session includes the step that: the PCRF sends a first message that requests termination of the first TDF session to the TDF, wherein a cause value indicating why the TDF session is terminated is carried in the first message, wherein the cause value is IPv4 address release.

Preferably, the first message is a Re-Authentication Request (RAR) message, wherein a value of Session-Id AVP carried in the RAR message is a session identifier of the first TDF session, and the value of Session-Release-Clause AVP carried in the RAR message is IP_ADDRESS_RELEASE.

According to another aspect of the invention, there is provided a PCRF, the PCRF includes: an association module, configured to link a first TDF session related with an IPv4 address and a second TDF session related with an IPv6 address to a same IP-CAN session; and a request module, configured to, when the IPv4 address of the IP-CAN session is released, request the TDF to terminate the first TDF session.

Preferably, the request module includes: a sending unit, configured to send a first message that requests termination of the first TDF session to the TDF, wherein a cause value indicating why the TDF session is terminated is carried in the first message, wherein the cause value is IPv4 address release.

Preferably, the PCRF further includes: a receiving module, configured to receive an acknowledgement message of the first message from the TDF and receive the second message that requests termination of the TDF session related with the IPv4 address from the TDF; and a returning module, configured to, after the receiving module receives the second message that requests termination of the TDF session related with the IPv4 address from the TDF, return the acknowledgement message of the second message to the TDF.

According to another aspect of the invention, there is further provided a PCRF, including: an association module, configured to link a first TDF session related with an IPv4 address to one IP-CAN session; and a request module, configured to, when the IPv4 address of the IP-CAN session is released, request the TDF to terminate the first TDF session.

Preferably, the request module includes: a sending unit, configured to send a first message that requests termination of the first TDF session to the TDF, wherein a cause value indicating why the TDF session is terminated is carried in the first message, wherein the cause value is IPv4 address release.

Preferably, the PCRF further includes: a receiving module, configured to receive an acknowledgement message of the first message from the TDF and receive the second message that requests termination of the TDF session related with the IPv4 address from the TDF; and a returning module, configured to, after the receiving module receives the second message that requests termination of the TDF session related with the IPv4 address from the TDF, return the acknowledgement message of the second message to the TDF.

According to the invention, the method is adopted as follows: the PCRF links a first TDF session related with an IPv4 address and a second TDF session related with a first IPv6 address to a same IP-CAN session; when the IPv4 address of the IP-CAN session is released, the PCRF requests the TDF to terminate the first TDF session, i.e., after the IPv4 address of the IP-CAN session is released, the PCRF sends a termination request to the TDF to terminate the first TDF session. By using the above method, the problem in the relevant technology that the PCRF makes a wrong policy because the IPv4 address is released only and the TDF session related with the IPv4 address is not terminated when the IPv4 address of the IP-CAN session is released is solved. By terminating the TDF session associated with the IPv4 address at the same time that the address is released, the resource utilization ratio is improved and the working efficiency of a system is improved.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE INVENTION

Hereinafter, the invention will be described in detail in conjunction with the embodiments with reference to the accompanying drawings. It should be noted that the embodiments of the application and the features of the embodiments can be combined with each other without any conflict.

Figure 3:
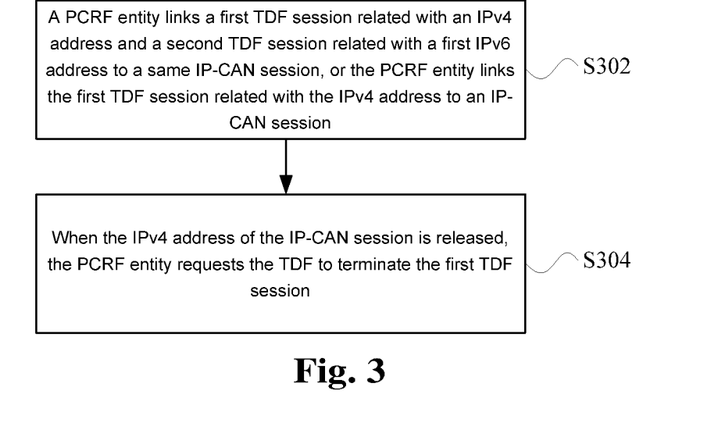
FIG. 3 is a flowchart of a method for processing TDF session according to an embodiment of the invention.

With regard to the problem in the relevant technology that the PCRF makes a wrong policy because the IPv4 address is released only and the TDF session related with the IPv4 address is not terminated when the IPv4 address of the IP-CAN session is released, the embodiment of the invention provides a method for processing TDF session, the process of which is as shown in FIG. 3, and includes Step S302 to Step S304:

Step S302: A PCRF links a first TDF session related with an IPv4 address and a second TDF session related with a first IPv6 address to a same IP-CAN session, or the PCRF links the first TDF session related with the IPv4 address to one IP-CAN session.

Step S304: When the IPv4 address of the IP-CAN session is released, the PCRF requests the TDF to terminate the first TDF session.

According to the embodiment of the invention, the method is adopted as follows: the PCRF links an IPv4 related TDF session and an IPv6 related TDF session to a same IP-CAN session or the PCRF links the first TDF session related with the IPv4 address to one IP-CAN session; when the IPv4 address of the IP-CAN session is released, the PCRF requests the TDF to terminate the TDF session related with the IPv4 address. By using the above embodiment, the problem in the relevant technology that the PCRF makes a wrong policy because the IPv4 address is released only and the TDF session related with the IPv4 address is not terminated when the IPv4 address of the IP-CAN session is released is solved. By terminating the TDF session related with the IPv4 address at the same time that the address is released, the resource utilization ratio is improved and the working efficiency of a system is improved.

During the process, the execution condition of Step S304 is that the PCRF knows the IPv4 address of the IP-CAN session is released. The implementation of the condition may include the following processes:

(1) The PCEF sends the Indication of IP-CAN session modification message to the PCRF, wherein the IP address release indication and the released IPv4 address are carried in the Indication of IP-CAN session modification message. In the process of implementation, the Indication of IP-CAN session modification message is used for indicating the release of the IPv4 address.

(2) After receiving the Indication of IP-CAN session modification message, the PCRF, in response, sends the acknowledgement message of Indication of the IP-CAN session modification message to the PCEF. From a receiving side, the PCEF receives the IP-CAN session modification acknowledgement message returned by the PCRF.

When the above condition is satisfied, the process that the PCRF requests the TDF to terminate the first TDF session may include the following steps: in the case that the PCRF determines that the IP-CAN session is linked to the first TDF session and the second TDF session simultaneously, the PCRF sends the first message that requests termination of the first TDF session to the TDF, wherein the cause value indicating why the TDF session is terminated is carried in the first message, wherein the cause value is IPv4 address release. When the first message is a Re-Authentication Request (RAR) message, the value of Session-Id AVP carried in the RAR message is the session identifier of the first TDF session, and the value of Session-Release-Clause AVP carried in the RAR message is IP_ADDRESS_RELEASE.

After the PCRF sends the first message that requests termination of the first TDF session to the TDF, the TDF returns the acknowledgement message of the first message to the PCRF; and the TDF sends the second message that requests termination of the first TDF session to the PCRF. When the second message is the Credit Control Request (CCR) message, wherein the value of Session-Id AVP carried in the CCR message is the session identifier of the first TDF session, and the value of CC-Release-Type AVP carried in the CCR message is TERMINATION_REQUEST.

After the PCRF receives the second message that requests termination of the TDF session related with the IPv4 address sent by the TDF, in response, the PCRF returns the acknowledgement message of the second message to the TDF. From the other side, the TDF receives the acknowledgement message of the second message.

After the PCRF returns the acknowledgement message of the second message to the TDF, the TDF terminates the TDF session related with the IPv4 address of the PCRF, and at this time, the IPv4 address may be allocated to other UE for use. When the network allocates the released IPv4 address to the IP-CAN session of other UE, the UE that the IPv4 address is allocated to accesses the traffic through the IP-CAN session corresponding to the IPv4 address.

The TDF detects the data flow according to the preconfigured ADC rule. When detecting that the traffic data flow related with the IPv4 address needs to report the application information, it is necessary to determine the case among the IPv4 address, the IPv6 address and the IP-CAN session, i.e., it is determined whether the IPv4 address and the IPv6 address belong to the same IP-CAN session, wherein the IPv6 address is the address in the IP-CAN session from other UE, which is a new address, different from the first IPv6 address, also called a second IPv6 address here.

If the TDF determines that the IPv4 address and the IPv6 address belong to the same IP-CAN session, and the TDF session corresponding to the second IPv6 address is established, the TDF reports the application information of the IPv4 address through the TDF session corresponding to the second IPv6 address.

If the TDF is unable to determine whether the IPv4 address and the second IPv6 address belong to the same IP-CAN session, the TDF initiates the TDF session establishment process of the IPv4 address to the PCRF.

By using the above embodiments, it is possible to avoid a wrong policy formulated by the PCRF. The TDF session processing method is further described in detail in conjunction with the preferred embodiments of the invention.

Figure 4:
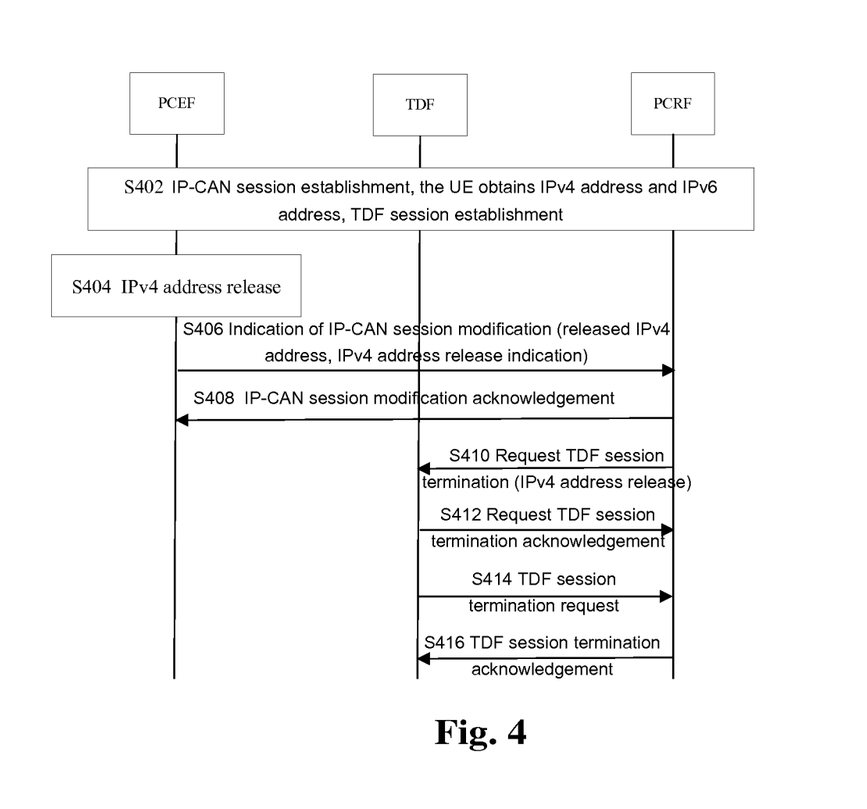
FIG. 4 is a flowchart of a method for processing TDF according to a preferred embodiment of the invention.

In FIG. 4, the TDF is deployed independently. Under different scenarios, the PCRF is different. For the home routing roaming scenarios, the PCRF in FIG. 4 is a local breakout roaming scenario of an H-PCRF, and the PCRF is a V-PCRF. The method in FIG. 4 includes Step S402 to Step S416:

Step S402: The UE establishes an IP-CAN session, and obtains prefixes of the IPv4 address and the IPv6 address. The UE constructs one or more IPv6 addresses according to the IPv6 address prefix. The UE accesses the traffic through the IPv4 address and the IPv6 address, respectively. After the TDF detects the traffic, the UE establishes the IPv4 related TDF session and the IPv6 related TDF session with the PCRF, respectively. The PCRF links the TDF session related with the IPv4 address and the TDF session related with one or more IPv6 addresses to one IP-CAN session.

Step S404: The gateway where the PCEF is located or another external network element releases the IPv4 address which was allocated for the UE before.

Step S406: The PCEF sends the Indication of IP-CAN session modification message to the PCRF, and the IP address release indication and the released IPv4 address are carried in the Indication of IP-CAN session modification message.

Step S408: The PCRF returns the acknowledgement message of the Indication of IP-CAN session modification message to the PCEF.

Step S410: When the PCRF determines that the IP-CAN session is linked to the TDF session related with the IPv4 address and the TDF session related with the IPv6 address simultaneously, the PCRF sends a request of TDF session termination message, and requests termination of the TDF session (i.e., TDF session1) related with the IPv4 address, and the cause value indicating why the IP address is released is carried in the message.

During specific implementation, the PCRF makes the RAR message carry the Session-Id AVP, the value of which is a session identifier of the TDF session1, and the Session-Release-Clause AVP, the value of which is IP_ADDRESS_RELEASE.

Step S412: The TDF returns the acknowledgement message of the TDF session termination request message to the PCRF.

Step S414: The TDF sends the TDF session termination request message to the PCRF, and requests termination of the TDF session (i.e., TDF session1) related with the IPv4 address.

During specific implementation, the TDF makes the CCR message carry the CC-Request-Type AVP, the value of which is TERMINATION_REQUEST, and the Session-Id AVP, the value of which is a session identifier of the TDF session1.

Step S416: The PCRF returns the acknowledgement message of the TDF session termination request message to the TDF.

In Step S402, the UE establishes the IP-CAN session, and obtains prefixes of the IPv4 address and the IPv6 address. The UE constructs one or more IPv6 addresses according to the IPv6 address prefix. When the TDF detects that the UE accesses the application information of the traffic by using the IPv4 address and needs to be reported, the TDF establishes the IPv4 related TDF session with the PCRF. At this time, the TDF does not detect that the UE accesses the application information of the traffic by using the IPv6 address and needs to be reported, the TDF does not establish the IPv6 related TDF session with the PCRF. Therefore, the PCRF only associates the IPv4 related TDF session to the IP-CAN session. After Step 404 to Step 408 are executed, the PCRF knows that the IPv4 address is released. At Step 410, in the case that the PCRF determines that the IP-CAN session is linked to the TDF session related with the IPv4 address, the PCRF sends the request of TDF session termination message to the TDF, and requests termination of the TDF session (i.e., TDF session1) associated with the IPv4 address, and the cause value that the IP address is released is carried in the message. Continuing to execute Step 412 to Step 416, the IPv4 related TDF session is terminated.

Through the above processes, the TDF terminates the TDF session related with the IPv4 address of the PCRF. Thereafter, the network allocates the same IPv4 address to the IP-CAN session (representing IP-CAN session2) of other UE, and other UE that the IPv4 address is allocated to initiates the traffic access through the IP-CAN session corresponding thereto. When the TDF detects that the traffic data flow related with the IPv4 address needs to report the application information, there are three cases included:

Case I: If the TDF determines that the IPv4 address and one IPv6 address belong to the same IP-CAN session (i.e., IP-CAN session2), and the IPv6 address has a corresponding TDF session, the TDF reports the application information through the TDF session.

Case II: If the TDF is unable to determine the IPv4 address and one IPv6 address belong to the same IP-CAN session (i.e., IP-CAN session2), the TDF initiates the TDF session establishment process corresponding to the IPv4 address to the PCRF. The PCRF links the TDF session corresponding to the IPv4 address to one IP-CAN session (i.e., IP-CAN session').

Case III: The TDF always establishes the TDF session with the PCRF with respect to the IPv4 address, and the PCRF links the TDF session corresponding to the IPv4 address to one IP-CAN session.

By means of the above method, it is avoided that the PCRF uses the application information of the IP-CAN session2 to make the policy with respect to the IP-CAN session1.

Figure 5:
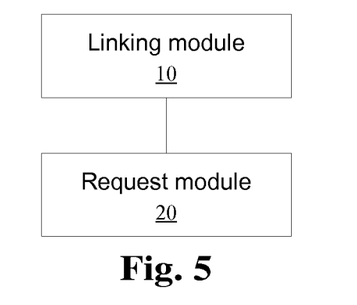
FIG. 5 is structure diagram I of a PCRF according to an embodiment of the invention.

According to another aspect of the invention, the embodiment of the invention also provides an PCRF, the structure diagram of which is as shown in FIG. 5, including a linking module 10, configured to link a first TDF session related with an IPv4 address and a second TDF session related with an IPv6 address to a same IP-CAN session; and a request module 20, which is coupled to the linking module 10, configured to, when the IPv4 address of the IP-CAN session is released, request the TDF to terminate the first TDF session.

In another preferred embodiment, the linking module 10 is configured to link the first TDF session related with the IPv4 address to one IP-CAN session; and the request module 20 is coupled to the linking module 10, and configured to, when the IPv4 address of the IP-CAN session is released, request the TDF to terminate the first TDF session.

Figure 6:
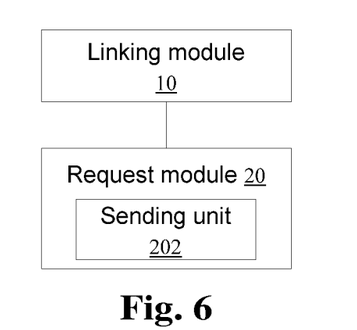
FIG. 6 is structure diagram II of a PCRF according to an embodiment of the invention.

FIG. 6 is a structure diagram, showing that the internal structure of the request module 20 is further refined. The request module 20 may include a sending unit 22, configured to send a first message that requests termination of the first TDF session to the TDF, wherein a cause value indicating why the TDF session is terminated is carried in the first message, wherein the cause value is IPv4 address release.

Figure 7:
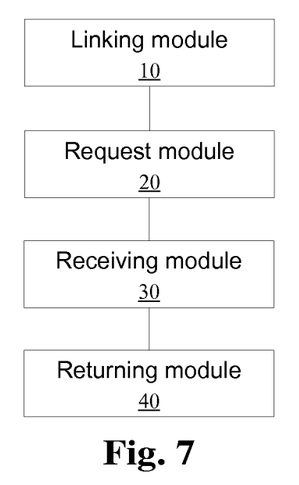
FIG. 7 is structure diagram III of a PCRF according to an embodiment of the invention.

The PCRF further includes: a receiving module 30 and a returning module 40 as shown in FIG. 7, wherein the receiving module 30 is coupled to the request module 20, and configured to receive an acknowledgement message of the first message from the TDF and receive the second message that requests termination of the TDF session linked with the IPv4 address from the TDF; and the returning module 40 is coupled to the receiving module 30, and configured to, after the receiving module receives the second message that requests termination of the TDF session related with the IPv4 address from the TDF, return the acknowledgement message of the second message to the TDF.

According to another aspect of the invention, the embodiment of the invention also provides a TDF, which is configured to interact with the PCRF. After the request module 20 of the PCRF sends the first message that requests termination of the first TDF session, in response, the TDF sends the acknowledgement message of the first message and the second message that requests termination of the first TDF session related with the IPv4 address to the PCRF, and the receiving module 30 of the PCRF receives the above message, and executes the subsequent processes.

It can be seen from the above-mentioned description that the invention realizes the following technical effects:

according to the embodiment of the invention, the method is adopted as follows: the PCRF links an IPv4 related TDF session and an IPv6 related TDF session to a same IP-CAN session or the PCRF links the first TDF session related with the IPv4 address to one IP-CAN session; when the IPv4 address of the IP-CAN session is released, the PCRF requests the TDF to terminate the TDF session related with the IPv4 address. By using the above embodiment, the problem in the relevant technology that the PCRF makes a wrong policy because the IPv4 address is released only and the TDF session related with the IPv4 address is not terminated when the IPv4 address of the IP-CAN session is released is solved. By terminating the TDF session related with the IPv4 address at the same time that the address is released, the resource utilization ratio is improved and the working efficiency of a system is improved.

Obviously, those skilled in the art should understand that each of the mentioned modules or steps of the invention can be realized by a universal computing device; the modules or steps can be focused on single computing device, or distributed on the network formed by multiple computing devices. Selectively, they can be realized by a program code which can be executed by the computing device. Thereby, the modules or steps can be stored in the storage device and executed by the computing device; and under some circumstances, the shown or described steps can be executed in different orders than those described herein, or can be independently manufactured as each integrated circuit module, or multiple modules or steps thereof can be manufactured to be single integrated circuit module, thus to be realized. In this way, the invention is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for processing Traffic Detection Function (TDF) session, comprising:
    a Policy and Charging Rules Function (PCRF) links a first TDF session related with an Internet Protocol version 4 (IPv4) address and a second TDF session related with a first Internet Protocol version 6 (IPv6) address to a same IP-Connectivity Access Network (IP-CAN) session; and
    when the IPv4 address of the IP-CAN session is released, the PCRF requests the TDF to terminate the first TDF session;
    wherein the release of IPv4 address of the IP-CAN session comprises:
    a Policy and Charging Enforcement Function (PCEF) sends an Indication of IP-CAN session modification message to the PCRF, wherein an IP address release indication and the released IPv4 address are carried in the Indication of IP-CAN session modification message.

2. The method according to claim 1, wherein requesting the TDF to terminate the first TDF session comprises:
    the PCRF sends a first message that requests termination of the first TDF session to the TDF, wherein a cause value indicating why the TDF session is terminated is carried in the first message, wherein the cause value is IPv4 address release.

3. The method according to claim 2, wherein the first message is a Re-Authentication Request (RAR) message, wherein a value of Session-Id Attribute Value Pair (AVP) carried in the RAR message is a session identifier of the first TDF session, and the value of Session-Release-Clause AVP carried in the RAR message is IP_ADDRESS_RELEASE.

4. The method according to claim 3, after the PCRF sends the first message that requests termination of the first TDF session to the TDF, the method further comprises:
    the TDF returns an acknowledgement message of the first message to the PCRF; and
    the TDF sends a second message that requests termination of the first TDF session to the PCRF.

5. The method according to claim 4, wherein the second message is a Credit Control Request (CCR) message, wherein the value of Session-Id AVP carried in the CCR message is the session identifier of the first TDF session, and the value of CC-Release-Type AVP carried in the CCR message is TERMINATION_REQUEST.

6. The method according to claim 5, after the PCRF receives the second message that requests termination of the TDF session related with the IPv4 address sent by the TDF, the method further comprises:
the PCRF returns the acknowledgement message of the second message to the TDF.

7. The method according to claim 4, after the PCRF receives the second message that requests termination of the TDF session related with the IPv4 address sent by the TDF, the method further comprises:
the PCRF returns the acknowledgement message of the second message to the TDF.

8. The method according to claim 7, after the PCRF returns the acknowledgement message of the second message to the TDF, the method further comprises:
in the case that the IPv4 address is allocated to the IP-CAN session of the other UE, when the TDF detects that an application corresponding to the IPv4 address needs to be reported, and if the TDF determines that the IPv4 address and the second IPv6 address belong to the same IP-CAN session, then the TDF reports application information of the IPv4 address through the TDF session corresponding to the second IPv6 address; and
in the case that the IPv4 address is allocated to the IP-CAN session of the other UE, when the TDF detects that the application corresponding to the IPv4 address needs to be reported, and if the TDF is unable to determines whether the IPv4 address and the second IPv6 address belong to the same IP-CAN session, the TDF initiates a TDF session establishment procedure of the IPv4 address to the PCRF.

9. A Policy and Charging Rules Function (PCRF) having a hardware processor, comprising:
a linking module, configured to link a first Traffic Detection Function (TDF) session related with an Internet Protocol version 4 (IPv4) address and a second TDF session related with an Internet Protocol version 6 (IPv6) address to a same IP-Connectivity Access Network (IP-CAN session); and
a request module, configured to, when the IPv4 address of the IP-CAN session is released, request the TDF to terminate the first TDF sessions;
wherein the request module comprises:
a sending unit, configured to send a first message that requests termination of the first TDF session to the TDF, wherein a cause value indicating why the TDF session is terminated is carried in the first message, wherein the cause value is IPv4 address release.

10. The PCRF according to claim 9, wherein the PCRF further comprises:
a receiving module, configured to receive an acknowledgement message of the first message from the TDF and receive the second message that requests termination of the TDF session related with the IPv4 address from the TDF; and
a returning module, configured to, after the receiving module receives the second message that requests termination of the TDF session related with the IPv4 address from the TDF, return the acknowledgement message of the second message to the TDF.

11. A method for processing Traffic Detection Function (TDF) session, comprising:
a Policy and Charging Rules Function (PCRF) links a first TDF session related with an Internet Protocol version 4 (IPv4) address to an IP-Connectivity Access Network (IP-CAN) session; and
when the IPv4 address of the IP-CAN session is released, the PCRF requests the TDF to terminate the first TDF session;
wherein the release of IPv4 address of the IP-CAN session comprises:
a Policy and Charging Enforcement Function (PCEF) sends an Indication of IP-CAN session modification message to the PCRF, wherein an IP address release indication and the released IPv4 address are carried in the IP-CAN session modification indication message.

12. The method according to claim 11, wherein requesting the TDF to terminate the first TDF session comprises:
the PCRF sends a first message that requests termination of the first TDF session to the TDF, wherein a cause value indicating why the TDF session is terminated is carried in the first message, wherein the cause value is IPv4 address release.

13. The method according to claim 12, wherein the first message is a Re-Authentication Request (RAR) message, wherein a value of Session-Id Attribute Value Pair (AVP) carried in the RAR message is a session identifier of the first TDF session, and the value of Session-Release-Clause AVP carried in the RAR message is IP_ADDRESS_RELEASE.

14. A Policy and Charging Rules Function (PCRF) having a hardware processor, comprising:
a linking module, configured to link a first Traffic Detection Function (TDF) session related with an Internet Protocol version 4 (IPv4) address to an IP-Connectivity Access Network (IP-CAN) session; and
a request module, configured to, when the IPv4 address of the IP-CAN session is released, request the TDF to terminate the first TDF sessions;
wherein the request module comprises:
a sending unit, configured to send a first message that requests termination of the first TDF session to the TDF, wherein a cause value indicating why the TDF session is terminated is carried in the first message, wherein the cause value is IPv4 address release.

15. The PCRF according to claim 14, wherein the PCRF further comprises:
a receiving module, configured to receive an acknowledgement message of the first message from the TDF and receive the second message that requests termination of the TDF session related with the IPv4 address from the TDF; and
a returning module, configured to, after the receiving module receives the second message that requests termination of the TDF session related with the IPv4 address from the TDF, return the acknowledgement message of the second message to the TDF.

* * * * *